Patented Feb. 17, 1948

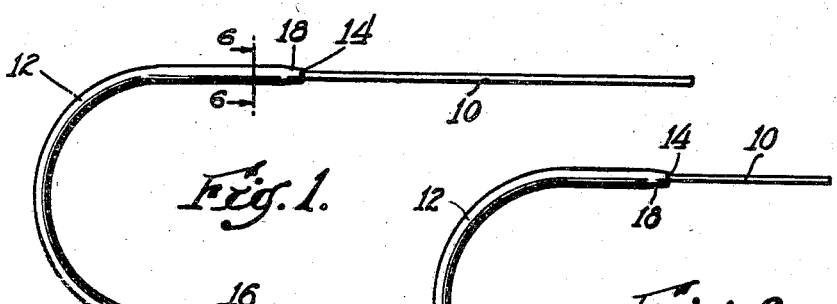
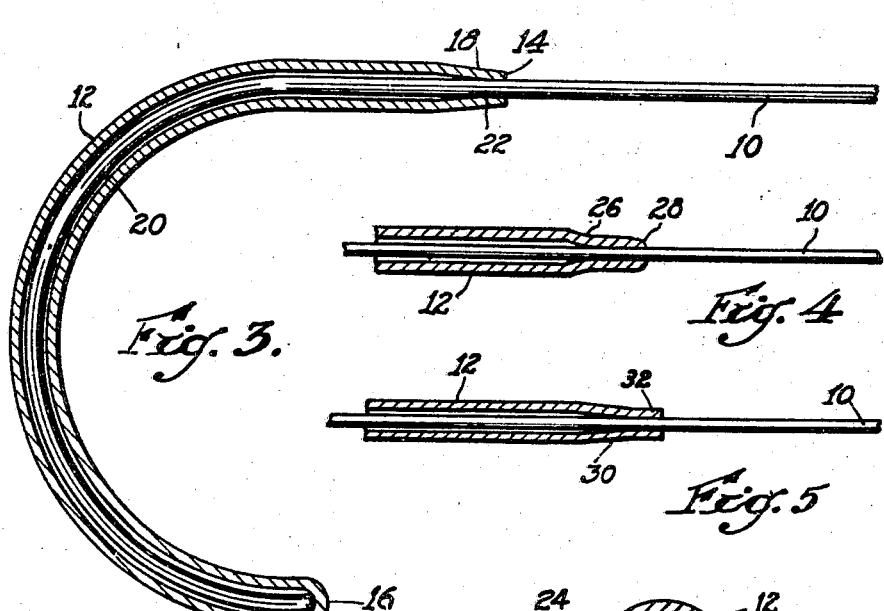
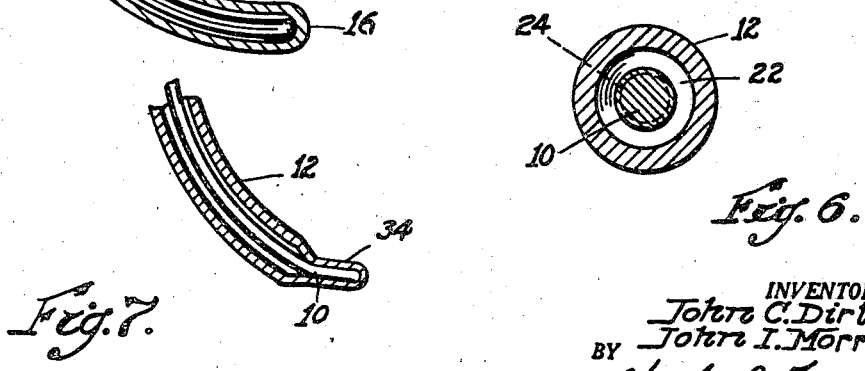

2,436,101

UNITED STATES PATENT OFFICE 2,436,101

REPLACEABLE OPTICAL TEMPLE COVER

John C. Dirlam and John I. Morris, Southbridge, Mass., assignors to J. I. Morris Co., Inc., Southbridge, Mass., a corporation of Massachusetts Application March 11, 1946, Serial No. 653,573

5 Claims. (Cl. 88—52)

This invention relates to new and improved optical temple covers which are adapted to be slid onto the optical temples and are capable of removal therefrom.

Objects of the invention include the provision of an optical temple cover made of an elastic deformable material, said cover being adapted to be slid onto the temple to cover the portion thereof adjacent the ear of the wearer, said temple cover being generally tubular and having an inside diameter throughout the major portion of its length sufficiently great to freely slidably receive any conventional temple, said cover having a reduced or constricted portion adjacent one end thereof to frictionally grip the temple, holding the same in position and sealing the cover against the entrance of foreign matter; the provision of an optical temple cover as above recited in which both the interior and exterior diameters of the tubular cover are reduced for the purpose above stated and to present a pleasing finished appearance; and the provision of an optical temple cover as above described having an open end and a closed end and including a restricted portion at the closed end thereof to grip the temple at the end of the latter.

Other objects and advantages of the invention will appear hereinafter.

Reference is to be had to the accompanying drawings, in which

Fig. 1 is a view in elevation showing the novel cover applied to a temple;

Fig. 2 is a view similar to Fig. 1 but showing a modification;

Fig. 3 is an enlarged longitudinal section of the cover of Fig. 1, showing the temple in place therein;

Figs. 4 and 5 are partial sections through modifications of the cover at the open end thereof and showing the temple therein, parts being broken away;

Fig. 6 is an enlarged section on line 6—6 of Fig. 1; and

Fig. 7 is a longitudinal section of the closed end of the cover of Fig. 2.

In Figs. 1 and 2 the temple is shown at 10, this temple being conventional and well known and having in commerce three standard diameters which vary about .006 of an inch. The cover forming the subject matter of this invention is generally indicated at 12 and has an open end at 14 and a closed end at 16. The cover is hollow and tubular and is provided with a reduced portion at the open end as shown at 18, this reduced portion presenting an improved appearance over covers of the prior art.

Referring to Fig. 3 it will be seen that the cover 12 freely slidably receives the ear bow 20 of the temple for a major portion of the length thereof, the inside diameter of the cover being greater than the diameter or thickness of the temple. However, at the open end 14 the inside diameter of the cover is reduced or constricted as clearly shown at 22. The reduction or constriction is preferred to provide an inside diameter of the cover at 22 which is slightly less than the thickness of the smallest commercial temple so that the reduced portion 18 of the cover will relatively tightly grip the temple so as to yieldingly maintain the cover where located on the temple and also to seal the cover itself against entrance of dirt or other foreign matter. The reduced tapering portion 18 blends into the contour of the temple and thus provides a finished appearance.

The cover may be of any material which is flexible, deformable, and at least slightly elastic so that the temple, when inserted in the cover, will slightly enlarge the restricted portion 22 as indicated in dotted lines at 24 in Fig. 6. The degree of deformation occasioned by the temple depends on the thickness of the temple, but the variations in temple thickness are so small that the smallest temple will be frictionally engaged and gripped by the short reduced portion 22 and sufficient gripping is achieved while still allowing the temple to be easily slid into the cover in the larger diameter temples.

Figs. 4 and 5 show two modified forms of the reduced open end of cover 12. In Fig. 4 the cover is sharply reduced as at 26 and then extends along the temple 10 as at 28. In Fig. 5 the cover 12 tapers gradually at 30 and then extends at 32 for a short distance along the temple as shown. In Fig. 3 the reduced portion 22 is shown as tapering exteriorly from end to end. These modifications all come within the scope of the invention.

The closed end 16 of the cover may also be reduced as shown at 34 in Fig. 7 to provide a second gripping point for the temple 10. The reduction at 34 is not necessary to the invention but provides an additional gripping action which may be used if desired.

It will be seen that this invention provides an attachable optical temple cover of deformable material with one or both ends tapered or reduced to make the temple cover fit tightly around the temple, keeping out dirt and preventing the cover from coming off the temple. Also this invention provides a single temple cover fitting all regular commercial temples in one size of cover and imparting a more finished appearance to the temple.

The invention is not limited to the ear bow, but on the other hand the temple cover may extend over the entire length of the temple, this being a mere matter of extending the length of the temple cover shown. Also, it is contemplated that the new temple cover may be made in more than one size of diameter to accommodate larger or smaller diameters of temples.

Having thus described our invention and the advantages thereof, we do not wish to be limited to the details herein disclosed, otherwise than as set forth in the claims, but what we claim is:

1. Optical temple cover comprising a tubular member of elastic material having an inside diameter of a dimension to freely slidably receive a temple and a short portion of the member having a reduced inside diameter adjacent an end of the member to frictionally grip the temple and seal the member about the temple, said tubular member being open at one end and closed at the other end, and said reduced portion being located adjacent said open end, and said tubular member including a short temple-end gripping portion adjacent the closed end of the tubular member.

2. Combination of an optical temple and a slidably removable cover therefor, said cover comprising a tubular elastic member having an open end and a closed end, said member having an inside diameter greater than the thickness of the temple, and a short portion of the cover member adjacent the open end having a reduced inside diameter originally less than the thickness of the temple, so that the cover member grips the temple at said reduced portion and the cover member is sealed thereby.

3. The combination of claim 2 wherein said cover has a reduced inside diameter at the closed end to grip the temple end.

4. Spectacle temple cover in the form of a hollow tube open at one end and closed at the other, said tube having an inside diameter greater than the thickness of the temple to freely slidably receive the temple, said tube having an interiorly constricted portion adjacent the open end to relatively tightly receive the temple to grip and yieldingly hold the latter at said portion.

5. Spectacle temple cover in the form of a hollow tube open at one end and closed at the other, said tube having an inside diameter greater than the thickness of the temple to freely slidably receive the temple, said tube having an interiorly constricted portion adjacent the open end to relatively tightly receive the temple to grip and yieldingly hold the latter at said portion, and an interiorly constricted temple-end gripping portion at the closed end of the tube.

JOHN C. DIRLAM.
JOHN I. MORRIS.

REFERENCES CITED

The following references are of record in the file of this patent:

UNITED STATES PATENTS

| Number | Name | Date |
| --- | --- | --- |
| 1,197,214 | Laflin | Sept. 5, 1916 |
| 1,664,966 | Boutelle | Apr. 3, 1928 |
| 1,806,464 | Housley | May 19, 1931 |
| 2,117,466 | Welsh | May 17, 1938 |